(12) United States Patent
Zhang et al.

(10) Patent No.: US 11,430,441 B2
(45) Date of Patent: Aug. 30, 2022

(54) VOICE DEVICE, INTERACTION METHOD OF SAME, DEVICE AND STORAGE MEDIUM

(71) Applicant: BAIDU ONLINE NETWORK TECHNOLOGY (BEIJING) CO., LTD., Beijing (CN)

(72) Inventors: Jing Zhang, Beijing (CN); Weinan Li, Beijing (CN); Yingqiao Gao, Beijing (CN); Feng Liu, Beijing (CN); Yuxin Gao, Beijing (CN); Jian Yu, Beijing (CN); Hongwei Cao, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 203 days.

(21) Appl. No.: 16/992,737

(22) Filed: Aug. 13, 2020

(65) Prior Publication Data

US 2021/0193140 A1    Jun. 24, 2021

(30) Foreign Application Priority Data

Jan. 7, 2020    (CN) .......................... 202010014939.9

(51) Int. Cl.
*G10L 15/22*    (2006.01)
(52) U.S. Cl.
CPC .................................... *G10L 15/22* (2013.01)
(58) Field of Classification Search
CPC ...................................................... G10L 15/22
See application file for complete search history.

(56) References Cited

U.S. PATENT DOCUMENTS

| 9,762,337 B2 | 9/2017 | Kawakami et al. |
| 2019/0304449 A1* | 10/2019 | Chang ..................... G10L 15/22 |
| 2019/0341049 A1* | 11/2019 | Cheng ................... G06F 1/3246 |

FOREIGN PATENT DOCUMENTS

| CN | 101771765 A | 7/2010 |
| CN | 208369787 U | 1/2019 |

(Continued)

OTHER PUBLICATIONS

Notice of Reason for Rejection for corresponding Japanese patent application No. 2020-141881 dated Oct. 26, 2021, four pages.

*Primary Examiner* — Ibrahim Siddo
(74) *Attorney, Agent, or Firm* — Harness, Dickey & Pierce, P.L.C.

(57) ABSTRACT

The present application discloses a voice device, an interaction method of the voice device, a device and a storage medium, where the interaction method is applied to the voice device, the voice device is in communicational connection with a control device, and the interaction method includes: in response to a received wake-up message, starting a first target application indicated by the wake-up message; in response to received operation data of a user sent by the control device, generating a first control instruction according to the operation data of the user; controlling, according to the first control instruction, the first target application to perform an operation indicated by the first control instruction. As a result, remote control of the first target application of the voice device by a user is achieved, and the remote operation scenario of the voice device is also realized.

20 Claims, 4 Drawing Sheets

(56) References Cited

FOREIGN PATENT DOCUMENTS

| | | | |
|---|---|---|---|
| JP | 2013108851 | A | 6/2013 |
| JP | 2017055936 | A | 3/2017 |
| JP | 2018206441 | A | 12/2018 |

\* cited by examiner

VOICE DEVICE, INTERACTION METHOD OF SAME, DEVICE AND STORAGE MEDIUM

CROSS-REFERENCE TO RELATED DISCLOSURES

This application claims priority to Chinese Patent Application No. 202010014939.9, filed on Jan. 7, 2020, which is hereby incorporated by reference in its entirety.

TECHNICAL FIELD

The present application relates to the field of interaction technologies, and in particular, to a voice device, an interaction method of the voice device, a device and a storage medium.

BACKGROUND

With the rapid development of the artificial intelligence technologies, functions of a voice device are becoming more and more abundant, and applications of the voice device are becoming wider and wider. An interaction mode of the voice device is one of the important factors that affect the functions and applications of the voice device.

In related art, the interaction mode of the voice device includes voice control and touch control, where the voice control includes: a user sends a voice instruction to the voice device, and the voice device recognizes and executes the voice instruction; the touch control includes: a user sends a control instruction to the voice device in a way of operating a touch screen, and the voice device recognizes and executes the control instruction.

However, the interaction mode in the way of voice control is not suitable for an intensive operation scenario, the interaction mode in the way of touch control is not suitable for a remote operation scenario. Hence, the existing interaction modes of the voice device adversely affect user experience, and cannot meet needs of the innovation and development for the voice device.

SUMMARY

Embodiments of the present application provide a voice device, an interaction method of the voice device, a device and a storage medium, for solving the problem that the existing interaction modes of a voice device are not suitable for the intensive operation scenario and the remote operation scenario.

In a first aspect, the present application provides an interaction method of a voice device, where the interaction method is applied to the voice device, the voice device is in communicational connection with a control device, and the interaction method includes:

in response to a received wake-up message, starting a first target application indicated by the wake-up message;

in response to received operation data of a user sent by the control device, generating a first control instruction according to the operation data of the user; and controlling, according to the first control instruction, the first target application to perform an operation indicated by the first control instruction.

Start of the first target application indicated by the wake-up message according to the received wake-up message can enable the user to remotely control to start the first target application; generation of a first control instruction, according to the received operation data of the user detected by the control device, for controlling the first target application to perform a corresponding operation, achieves the remote control of the first target application of the voice device, and realizes the remote operation scenario of the voice device, as well as the intensive operation scenario of the voice device.

Further, the in response to a received wake-up message includes: in response to a received wake-up message of the control device, where the wake-up message of the control device is generated when the user starts a second target application in the control device;

the second target application is an application software or an application plugin which is installed in the control device and corresponds to the first target application, and the second target application is capable of transmitting data to the voice device.

After the user starts the second target application in the control device, the control device sends the wake-up message, which is used for waking up the first target application installed in the voice device and corresponding to the second target application, to the voice device, so as to achieve the remote wake-up of the first target application of the voice device, as well as the remote operation of the voice device.

Further, the in response to a received wake-up message further includes: in response to a received wake-up message of the user;

after starting the first target application indicated by the wake-up message of the user in response to the received wake-up message of the user, the interaction method further includes:

sending a start instruction indicating an identity of the first target application to an application server, enabling the application server to send the start instruction to a terminal device, where the application server and the terminal device are in a long connection state;

after receiving the start instruction, starting, by the terminal device, the second target application corresponding to the start instruction.

When the user directly enters the wake-up message to the voice device, the voice device starts the first target application according to the wake-up message, and then the voice device sends a start instruction, which is used for starting the second target application installed in the control device and corresponding to the first target application, to the control device, synchronous start of the first target application in the voice device and the second target application in the control device provides an implementation basis for the user to remotely operate the voice device subsequently.

Further, the voice device is provided with a communication controller, the in response to received operation data of a user sent by the control device includes:

in response to the operation data of the user received by the communication controller and sent by the control device, where the operation data of the user is sent by the control device through a wireless network.

The communication control unit is arranged in the voice device, thus enabling direct data transmission between the voice device and the control device, thereby providing an implementation basis for the user to remotely operate the voice device.

Further, the operation data of the user is any one or more of following categories:

voice input of the user in the control device;

touch input of the user in an analog interface of the control device;

input of the user captured by a camera of the control device; and input of the user collected by a sensor of the control device.

Available operation data of the user is abundant and diverse, therefore, a sensing capability of the control device is sufficiently utilized, which is beneficial for improving an interaction capability of the voice device and expanding skill types of the voice device.

Further, the interaction method further includes:

receiving a second control instruction sent by the control device, and controlling, according to the second control instruction, the first target application to perform an operation indicated by the second control instruction, where the second control instruction is generated by the control device according to the operation data of the user detected.

The control device can directly generate, according to the operation data of the user detected, the second control instruction for controlling the first target application to perform a corresponding operation, the remote control mode of the voice device is flexible, and is therefore beneficial for improving the interaction capability of the voice device.

Further, the voice device includes a voice device with a screen, and the control device includes a mobile communication terminal.

The sufficient utilization of the sensing capability of the mobile communication terminal effectively improves the interaction performance of the voice device with a screen and enriches the skill types of the voice device with a screen.

In a second aspect, the present application provides a voice device, the voice device is in communicational connection with a control device, the voice device includes:

a first processing unit, configured to start a first target application indicated by a wake-up message in response to the received wake-up message;

a second processing unit, configured to generate a first control instruction according to the operation data of a user, in response to the received operation data of the user sent by the control device; and a third processing unit, configured to control, according to the first control instruction, the first target application to perform an operation indicated by the first control instruction.

Further, the first processing unit includes:

a first processing subunit, configured to start the first target application indicated by the wake-up message of the control device in response to the received wake-up message of the control device;

where the wake-up message of the control device is generated when the user starts a second target application in the control device;

the second target application is an application software or an application plugin which is installed in the control device and corresponds to the first target application, and the second target application is capable of transmitting data to the voice device.

Further, the first processing unit further includes:

a second processing subunit, configured to start the first target application indicated by a wake-up message of the user in response to the received wake-up message of the user;

the voice device further includes:

a fourth processing unit, configured to send a start instruction indicating an identity of the first target application to an application server, enabling the application server to send the start instruction to a terminal device, where the application server and the terminal device are in a long connection state;

after receiving the start instruction, starting, by the terminal device, the second target application corresponding to the start instruction.

Further, the voice device is provided with a communication control unit, and the first processing unit is configured to:

in response to the operation data of the user received by the communication control unit and sent by the control device, where the operation data of the user is sent by the control device through a wireless network.

Further, the operation data of the user is any one or more of following categories:

voice input of the user in the control device;

touch input of the user in an analog interface of the control device;

input of the user captured by a camera of the control device; and input of the user collected by a sensor of the control device.

Further, the voice device further includes:

a fifth processing unit, configured to receive a second control instruction sent by the control device, and control, according to the second control instruction, the first target application to perform an operation indicated by the second control instruction, where the second control instruction is generated by the control device according to the operation data of the user detected.

Further, the voice device includes a voice device with a screen, and the control device includes a mobile communication terminal.

In a third aspect, the present application provides an electronic device including:

at least one processor; and a memory in communicational connection with the at least one processor; where, the memory stores instructions executable by the at least one processor, the instructions are executed by the at least one processor, enabling the at least one processor to perform the interaction method according to any implementation manners of the first aspect.

In the fourth aspect, the present application provides a non-transitory computer readable storage medium storing computer instructions, where the computer instructions are used to cause the computer to perform the interaction method according to any implementation manners of the first aspect.

The present application discloses a voice device, an interaction method of the voice device, a device and a storage medium, where the interaction method is applied to the voice device, the voice device is in communicational connection with a control device, and the interaction method includes: in response to a received wake-up message, starting a first target application indicated by the wake-up message; in response to received operation data of a user sent by the control device, generating a first control instruction according to the operation data of the user; controlling, according to the first control instruction, the first target application to perform an operation indicated by the first control instruction. As a result, remote control of the first target application of the voice device by a user is achieved, and the remote operation scenario of the voice device is also realized. Meanwhile, since there is no need to directly operate the voice device by a user, therefore, the interaction method is suitable for the intensive operation scenario of the voice device.

The other effects of the above exemplary manners will be described below in conjunction with specific embodiments.

BRIEF DESCRIPTION OF DRAWINGS

The drawings are used to better understand the technical solution, rather than limiting the present application.

DESCRIPTION OF EMBODIMENTS

Figure 1:
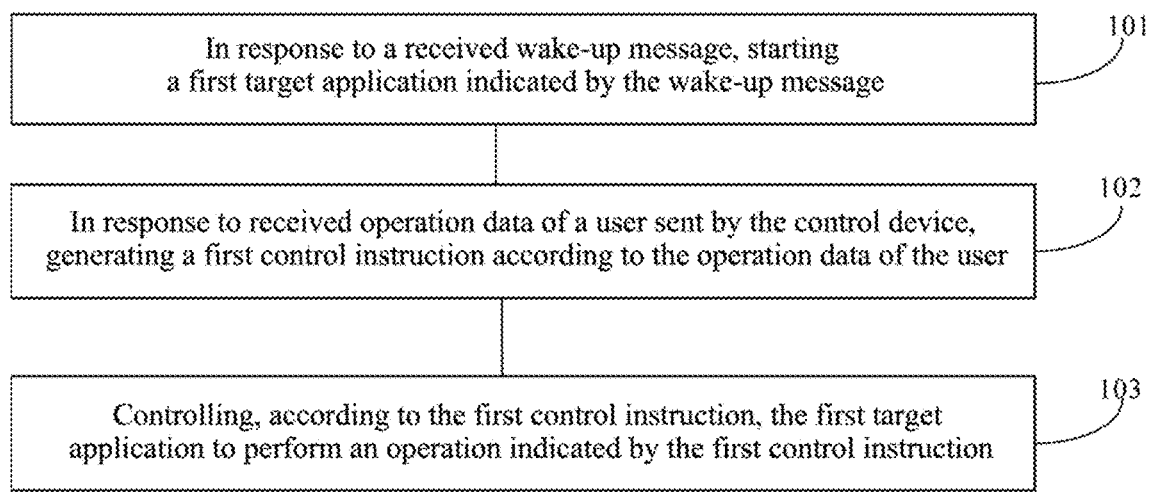
FIG. 1 is a schematic flowchart of an interaction method of a voice device provided by an embodiment of the present application.

Exemplary embodiments of the present application are illustrated below with reference to the drawings, various details of the embodiments of the present application are included to facilitate understanding, and they should be considered as merely exemplary. Therefore, those skilled in the art should understand that various changes and modifications can be made to the embodiments described herein without departing from the scope and spirit of the present application. Similarly, for the sake of clarity and conciseness, descriptions of well-known functions and structures are omitted in the following description.

Explanation of terms involved in the present application:

A communicational connection: communication is established between connected devices through transmission and interaction of signals, where the communicational connection includes a wired communicational connection and a wireless communicational connection.

SDK: a Software Development Kit, which is a collection used to assist in developing software related documents, software related examples and software related tools.

A communication controller: Communication Control Unit, which refers to a communication interface device located between a data circuit and a host and configured for controlling data transmission in a data communication system, and is abbreviated as CCU.

App: an abbreviation for Application, i.e. an application software.

A long connection: it means that multiple data packages can be sent continuously on a connection, in a maintenance period of the connection, if no data package is sent, both parties need to send link detection packages; the long connection is mostly used in point-to-point communication which is operated frequently.

MD5 Code: a Message-Digest Algorithm, message-digest algorithm, which is a widely used cryptographic hash function, and can generate a 128-bit (16 bytes) hash value used to ensure complete and consistent information transmission.

Application scenarios of the present application: with the rapid development of artificial intelligence technologies, functions of a voice device are becoming more and more abundant, and applications of them is becoming wider and wider. An interaction mode of the voice device is one of the important factors that affect the function and application of the voice device. In related art, the interaction mode of the voice device includes voice control and touch control, where the voice control includes: a user sends a voice instruction to the voice device, and the voice device recognizes and executes the voice instruction; the touch control includes: a user sends a control instruction to the voice device in a way of operating a touch screen, and the voice device recognizes and executes the control instruction.

However, the interaction mode in the way of voice control is not suitable for an intensive operation scenario, the interaction mode in the way of touch control is not suitable for a remote operation scenario. Hence, the existing interaction modes of the voice device adversely affect user experience, and cannot meet needs of the innovation and development for the voice device.

The present application provides a voice device, an interaction method of the voice device, a device and a storage medium, aiming to solve the above technical problem.

FIG. 1 shows an interaction method of a voice device provided by an embodiment of the present application, the interaction method is applied to the voice device, the voice device is in communicational connection with a control device. As shown in FIG. 1, the interaction method includes:

Step 101: in response to a received wake-up message, starting a first target application indicated by the wake-up message.

After receiving the wake-up message, in response to the received wake-up message, the voice device starts the first target application indicated by the wake-up message, where the first target application includes an application software and an application program which are installed in the voice device; the application software can be an independent APP installed in the voice device, the application program can be a plugin and an applet, etc. installed in the voice device. The wake-up message includes an identity of the first target application therein, the voice device starts the first target application corresponding to the identity based on the identity in the wake-up message. The identity included in the wake-up message is a unique identification code for the first target application. Specifically, the identity may be a name of an application package of the first target application or an MD5 code, etc. For example, the wake-up message received by the voice device is a user's voice instruction "open Fruit Slice", the voice device recognizes and extracts key information "Fruit Slice" in the voice instruction; after recognizing semantic information of the voice instruction, the voice device generates a control instruction for starting the target application based on the voice instruction, and starts the "Fruit Slice" APP based on the control instruction. By receiving the wake-up message and starting the first target application indicated by the wake-up message according to the wake-up message, the user is enabled to remotely start the target application in the voice device, thus achieving the remote control of the voice device.

Step 102: in response to received operation data of a user sent by the control device, generating a first control instruction according to the operation data of the user.

In the present embodiment, specifically, the voice device and the control device are in the state of communicational connection, where the communicational connection mainly includes wireless communicational connection, the wireless communicational connection includes, but is not limited to WIFI, a cellular network, Bluetooth, infrared communication, a network hotspot, etc. A communication controller is arranged in the voice device, functions that the communication controller can implement include: assembling a serial stream of bits in a data circuit into characters, or splitting characters into a serial stream of bits; implementation of a conversion between a transmission code and an internal code of a voice device host, thereby achieving the wireless communication between the voice device and the control device.

The voice device receives the operation data of the user sent by the control device, where the operation data of the user is generated when the user operates the control device, and the operation data of the user is any one or more of following categories: key input of the user in the control device, voice input of the user in the control device, touch input of the user in an analog interface of the control device, input of the user captured by a camera of the control device, and input of the user collected by a sensor of the control device. Specifically, the key input of the user in the control device includes information entered by the user through keys and buttons of the control device; the voice input of the user in the control device includes voice information input by the user to the control device; the touch input of the user in the analog interface of the control device includes touch input of the user through handwriting, typing, touching, swiping, clicking, etc. in the analog interface of the control device; the input of the user captured by the camera of the control device includes image data, video data, etc. generated from collection through the camera of the control device by the user; and the input of the user collected by the sensor of the control device includes position, motion, displacement, temperature and other data generated from collection through the sensor of the control device by the user. For example, the operation data of the user includes motion sensing data of the user detected by a gyroscope in a smartphone, specifically including information such as a displacement distance, a displacement direction, a speed, an acceleration of the user's limbs. The operation data of the user received by the voice device is diverse and flexible, thus facilitating implementations of more abundant functions and wider applications of the voice device.

Figure 1A:
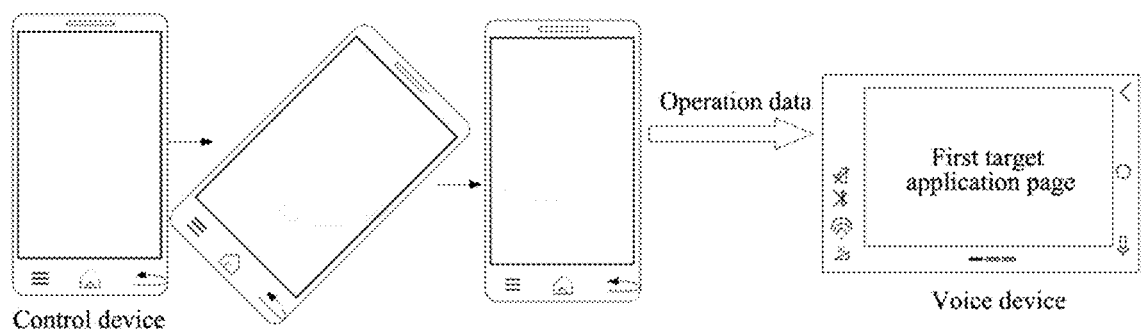
FIG. 1a is a schematic diagram of an interaction scenario of a voice device provided by an embodiment of the present application.

FIG. 1a is a schematic diagram of an interaction scenario of a voice device provided by an embodiment of the present application. As shown in FIG. 1a, an operation performed by a user to the control device is a shaking operation, the control device detects the operation data generated by the shaking operation of the user, specifically including information such as a shaking angle, a shaking direction, a shaking speed, etc., and the control device sends the operation data of the user detected to the voice device, so that the voice device generates, according to the operation data generated by the user shaking the control device, the first control instruction for controlling the first target application to perform a corresponding operation.

After obtaining the operation data of the user sent by the control device, the voice device recognizes the received operation data of the user, and generates the first control instruction according to the operation data of the user. Specifically, after receiving an array consisting of the operation data of the user sent by the control device, the voice device utilizes a communication controller to convert the array consisting of the operation data of the user into data which can be recognized by the voice device, constituting the first control instruction. The process of generating the first control instruction by the voice device based on the operation data of the user can be implemented by using the prior art, which will not be detailed in the present application.

Step 103: controlling, according to the first control instruction, the first target application to perform an operation indicated by the first control instruction.

In the present embodiment, specifically, the voice device generates the first control instruction according to the received operation data of the user, where the first control instruction is a command that can be directly read and executed by the voice device. Control of the first target application to perform the operation indicated by the first control instruction refers to control of the first target application to perform the operation corresponding to the operation data of the user detected by a terminal device, thereby achieving the user's operation in the terminal device; the first target application of the voice device performs the corresponding operation remotely, hence enabling remote control of the voice device by the user, which is therefore suitable for the remote control application scenario of the voice device, and can thus reduce direct operations of the voice device by the user effectively.

The present embodiment provides an interaction method of a voice device, where the interaction method is applied to the voice device, and the interaction method includes: in response to a received wake-up message, starting a first target application indicated by the wake-up message; in response to received operation data of a user sent by the control device, generating a first control instruction according to the operation data of the user; controlling, according to the first control instruction, the first target application to perform an operation indicated by the first control instruction. Start of the first target application indicated by the wake-up message after receiving the wake-up message can achieve remote start of the target application of the voice device; after receiving the operation data of the user sent by the terminal device, generating the first control instruction according to the received operation data of the user, and controlling the first target application to perform the operation indicated by the first control instruction, thus achieving the detection of the operation data of the user in the control device; by sending the operation data of the user to the voice device, the voice device controls the first target application to perform the operation corresponding to the operation data of the user, so that the remote control of the voice device by the user is achieved, and the remote operation scenario of the voice device is also realized; in this way, there is no need for the user to directly operate the voice device, and the operating manner of the user remotely operating the voice device is flexible and diverse, which is thus suitable for the intensive operation scenario of the voice device.

Figure 2:
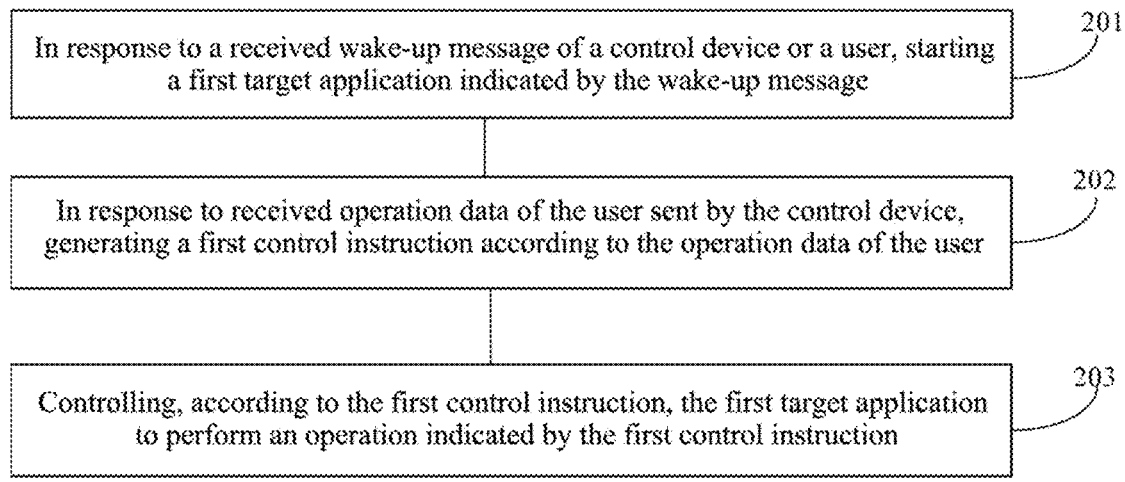
FIG. 2 is a schematic flowchart of another interaction method of a voice device provided by an embodiment of the present application.

FIG. 2 is a flowchart of another interaction method of a voice device provided by an embodiment of the present application. The interaction method is applied to the voice device, as shown in FIG. 2, the interaction method includes:

Step 201: in response to a received wake-up message of a control device or a user, starting a first target application indicated by the wake-up message.

Alternatively, Step 201 includes in response to a received wake-up message of the control device, where the wake-up message of the control device is generated when the user starts a second target application in the control device; the second target application is an application software or an application plugin which is installed in the control device and corresponds to the first target application, and the second target application is capable of transmitting data to the voice device.

After the user starts the second target application in the control device, a connection is established between the second target application and the voice device through wireless communication, the control device generates a wake-up message, and sends the wake-up message to the voice device, so that the voice device starts the first target application corresponding to the second target application after receiving the wake-up message. The first target application and the second target application which are corresponding application software or application plugins are installed in the voice device and the control device, respectively; in order to achieve that one target application can be started in a device synchronously after starting another target application in another device, it is required to enable option settings such as "starting synchronization" and "allowing remote control" for the first target application and the second target application in advance. For example, the first target application is an APP, "Fruit Slice", installed in the voice device; the second target application is an applet, "Fruit Slice", installed in the control device. The second target application can transmit data to the voice device directly, it is required that the second target application is integrated with a Software Development Kit (SDK) of the voice device, or the second target application is an application plugin installed in an application software capable of communicating directly with the voice device, for example, the voice device is an intelligent speaker, the control device is a smartphone, and the second target application is an applet, "Fruit Slice", installed in a speaker control software in the smartphone, since the application software can communicate with the voice device directly, the application plugin installed in the application software can also communicate with the voice device directly, accordingly, the second target application can transmit the wake-up message to the voice device directly.

Alternatively, Step 201 further includes in response to a received wake-up message of a user; after starting the first target application indicated by the wake-up message of the user in response to the received wake-up message of the user, the interaction method further includes: sending a start instruction indicating an identity of the first target application to an application server, enabling the application server to send the start instruction to a terminal device, where the application server and the terminal device are in a long connection state; after receiving the start instruction, the terminal device starts the second target application corresponding to the start instruction.

When the received wake-up message is the received wake-up message of the user, the first target application indicated by the wake-up message of the user is started. The wake-up message of the user includes a voice instruction of the user and an operation instruction of the user in the voice device, and the wake-up message is used to instruct to start the first target application in the voice device. After successfully starting the first target application in the voice device, in order to enable the user to control the voice device remotely through the control device, in this case, it is required to start the second target application corresponding to the first target application in the control device.

In order to synchronously start the second target application in the control device after receiving the wake-up message from the user to the voice device, the voice device sends a start instruction including the identity of the first target application to a cloud platform through a wireless network, the cloud platform forwards the start instruction to an application server; since the application server and the control device are in a long connection state, the application server forwards the start instruction to the control device; after receiving the start instruction including the identity of the first target application, the control device starts the second target application corresponding to the start instruction.

Step 202: in response to received operation data of the user sent by the control device, generating a first control instruction according to the operation data of the user.

In the present embodiment, specifically, when the user operates in the terminal device, the terminal device detects the operation data of the user, and sends the operation data of the user detected to the voice device, so that the voice device generates a control instruction for controlling the first target application to perform a corresponding operation, thus achieving the remote control of the first target application of the voice device by the user.

The control instruction for controlling the first target application to perform the corresponding operation is generated based on the operation data of the user detected in the terminal device, where a way to generate the control instruction includes: the terminal device sends the operation data of the user detected to the voice device, the voice device generates a first control instruction according to the received operation data of the user, and controls, according to the first control instruction, the first target application to perform the operation corresponding to the operation data of the user; another way to generate the control instruction includes: the terminal device generates a second control instruction according to the operation data of the user detected, and sends the second control instruction to the voice device, so that the voice device controls, according to the second control instruction, the first target application to perform the operation corresponding to the operation data of the user.

Exemplarily, after starting the "Fruit Slice" APP in a smartphone and an intelligent speaker, a user holds the smartphone to perform a waving motion, so the operation data of the user is detected by a gyroscope set in the smartphone, and the operation data of the user is an array consisting of a motion sensing displacement direction from left to right, a motion sensing displacement distance of 30 cm and a speed of 0.5 m/s of the user; the smartphone sends the array consisting of the operation data of the user to the intelligent speaker, the intelligent speaker generates a first control instruction based on the received array consisting of the operation data of the user, and controls, according to the first control instruction, game objects in the "Fruit Slice" APP to complete the corresponding operation.

Step 203: controlling, according to the first control instruction, the first target application to perform an operation indicated by the first control instruction.

In the present embodiment, specifically, the voice device controls, according to the first control instruction, the first target application to perform an operation indicated by the first control instruction, when the first target application performs the corresponding operation, the voice device uploads lightweight operation data and an operation result to an application server, and receives operational logic and operation content delivered by the application server at the same time. When the first target application in the voice device performs the operation indicated by the first control instruction, the second target application in the control device displays prompt information showing operation in progress.

In the present embodiment, the voice device can be a voice device with a screen, such as an intelligent speaker with a screen and an intelligent video speaker; the control device can be a mobile communication terminal, such as a smartphone and a tablet computer. A user operates by using the mobile communication terminal, the mobile communication terminal collects the operation data of the user and sends the operation data of the user collected to the intelligent speaker with the screen; the intelligent speaker with the screen generates the first control instruction according to the operation data of the user received, and controls, according to the first control instruction, the target application to complete the corresponding operation. Exemplarily, compared to the case that a user play games by holding a hand-hold controller in the prior art, the hand-hold controller acquires motion sensing information of the user and sends the motion sensing information to a game console, so that the game console generates, based on the motion sensing information of the user, the control instruction for controlling game objects to operate; in the present embodiment, the user holds the smartphone, where the smartphone serves as a hand-hold controller, the smartphone acquires motion sensing information of the user and sends the motion sensing information to the intelligent speaker with the screen, so that the intelligent speaker with the screen generates, based on the motion sensing information, the first control instruction for controlling game objects to operate. The present method takes full advantage of a sensing capability of the mobile communication terminal, thus improving interaction performance of the voice device with the screen, and enriching skill types of the voice device with the screen.

The present embodiment provides another interaction method of a voice device, the interaction method is applied to the voice device, and the interaction method includes: in response to a received wake-up message of the control device or the user, starting a first target application indicated by the wake-up message; in response to received operation data of a user sent by the control device, generating a first control instruction according to the operation data of the user; controlling, according to the first control instruction, the first target application to perform an operation indicated by the first control instruction. A user can directly wake up the first target application in the voice device, and can also indirectly wake up the first target application in the voice device by waking up the second target application in the control device, thereby achieving the remote wake-up of the first target application of the voice device, as well as the remote operation of the voice device; the control device collects the operation data of the user in the control device, and sends the operation data of the user to the voice device, so that the voice device generates, according to the operation data of the user, the first control instruction for controlling the first target application to perform the corresponding operation. By operating in the control device, the remote control of the first target application of the voice device by the user is achieved, and the remote operation scenario of the voice device is realized; in this way, a user can control the target application in the voice device to implement the corresponding operation without directly operating the voice device, which is therefore suitable for the intensive operation scenario of the voice device, and can thus reduce direct operations of the voice device by the user effectively, thereby improving user experience and extending a service life of the voice device; besides, a sensing capability of the control device is sufficiently utilized, thereby improving an interaction capability of the voice device and enriching skill types of the voice device effectively, which consequently facilitates innovation and progress of functions of the voice device.

Figure 3:
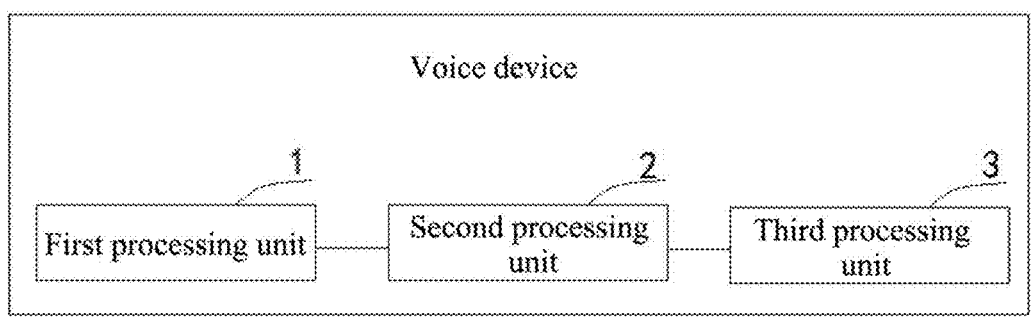
FIG. 3 is a schematic structural diagram of a voice device provided by an embodiment of the present application.

FIG. 3 is a schematic structural diagram of a voice device provided by an embodiment of the present application. As shown in FIG. 3, the voice device includes:

a first processing unit 1, configured to start a first target application indicated by a wake-up message in response to the received wake-up message;

a second processing unit 2, configured to generate a first control instruction according to the operation data of a user, in response to the received operation data of the user sent by the control device; and a third processing unit 3, configured to control, according to the first control instruction, the first target application to perform an operation indicated by the first control instruction.

The present embodiment provides a schematic structural diagram of a voice device, the voice device includes: a first processing unit, configured to start a first target application indicated by a wake-up message in response to the received wake-up message; a second processing unit, configured to generate a first control instruction according to the operation data of a user, in response to the received operation data of the user sent by the control device; and a third processing unit, configured to control, according to the first control instruction, the first target application to perform an operation indicated by the first control instruction. Start of the first target application indicated by the wake-up message after receiving the wake-up message can achieve the remote start of the target application of the voice device; after receiving the operation data of the user sent by the terminal device, generating the first control instruction according to the received operation data of the user, and controlling the first target application to perform the operation indicated by the first control instruction, thus achieving the detection of the operation data of the user in the control device; by sending the operation data of the user to the voice device, the voice device controls the first target application to perform the operation corresponding to the operation data of the user, so that the remote control of the voice device by the user is achieved, and the remote operation scenario of the voice device is also realized; in this way, there is no need for the user to directly operate the voice device, and the operating manner of the user remotely operating the voice device is flexible and diverse, which is thus suitable for the intensive operation scenario of the voice device.

Figure 4:
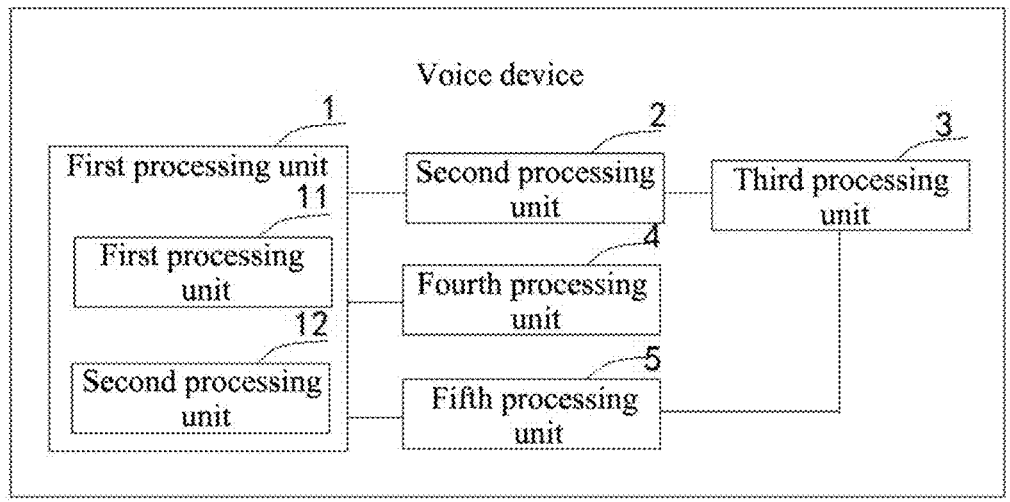
FIG. 4 is a schematic structural diagram of another voice device provided by an embodiment of the present application.

FIG. 4 is a schematic structural diagram of another voice device provided by an embodiment of the present application, on the basis of FIG. 3, as shown in FIG. 4:

the first processing unit 1 includes:

a first processing subunit 11, configured to start the first target application indicated by a wake-up message of the control device in response to the received wake-up message of the control device;

where the wake-up message of the control device is generated when the user starts a second target application in the control device;

the second target application is an application software or an application plugin which is installed in the control device and corresponds to the first target application, and the second target application is capable of transmitting data to the voice device.

The first processing unit 1 further includes:

a second processing subunit 12, configured to start the first target application indicated by a wake-up message of the user in response to the received wake-up message of the user;

the voice device further includes:

a fourth processing unit 4, configured to send a start instruction indicating an identity of the first target application to an application server, enabling the application server to send the start instruction to a terminal device, where the application server and the terminal device are in a long connection state;

after receiving the start instruction, starting, by the terminal device, the second target application corresponding to the start instruction.

The voice device is provided with a communication control unit, the first processing unit 1 is configured to:

in response to the operation data of the user received by the communication control unit and sent by the control device, where the operation data of the user is sent by the control device through a wireless network.

The operation data of the user is any one or more of following categories:

voice input of the user in the control device;

touch input of the user in an analog interface of the control device;

input of the user captured by a camera of the control device; and input of the user collected by a sensor of the control device.

The voice device further includes:

a fifth processing unit 5, configured to receive a second control instruction sent by the control device, and control, according to the second control instruction, the first target application to perform an operation indicated by the second control instruction, where the second control instruction is generated by the control device according to the operation data of the user detected.

The voice device includes a voice device with a screen, and the control device includes a mobile communication terminal.

The present embodiment provides a schematic structural diagram of another voice device, the voice device includes: a first processing unit, configured to start a first target application indicated by a wake-up message in response to the received wake-up message of the user or the control device; a second processing unit, configured to generate a first control instruction according to the operation data of a user, in response to the received operation data of the user sent by the control device; a third processing unit, configured to control, according to the first control instruction, the first target application to perform an operation indicated by the first control instruction. A user can directly wake up the first target application in the voice device, and can also indirectly wake up the first target application in the voice device by waking up the second target application in the control device, thereby achieving the remote wake-up of the first target application of the voice device, as well as the remote operation of the voice device; the control device collects the operation data of the user in the control device, and sends the operation data of the user to the voice device, so that the voice device generates, according to the operation data of the user, the first control instruction for controlling the first target application to perform the corresponding operation. By operating in the control device, the remote control of the first target application of the voice device by the user is achieved, and the remote operation scenario of the voice device is realized; in this way, a user can control the target application in the voice device to implement the corresponding operation without directly operating the voice device, which is therefore suitable for the intensive operation scenario of the voice device, and can thus reduce direct operations of the voice device by the user effectively, thereby improving user experience and extending a service life of the voice device; besides, a sensing capability of the control device is sufficiently utilized, thereby improving an interaction capability of the voice device and enriching skill types of the voice device effectively, which consequently facilitates innovation and progress of functions of the voice device.

According to the embodiment of the present application, the present application further provides an electronic device and a readable storage medium.

Figure 5:
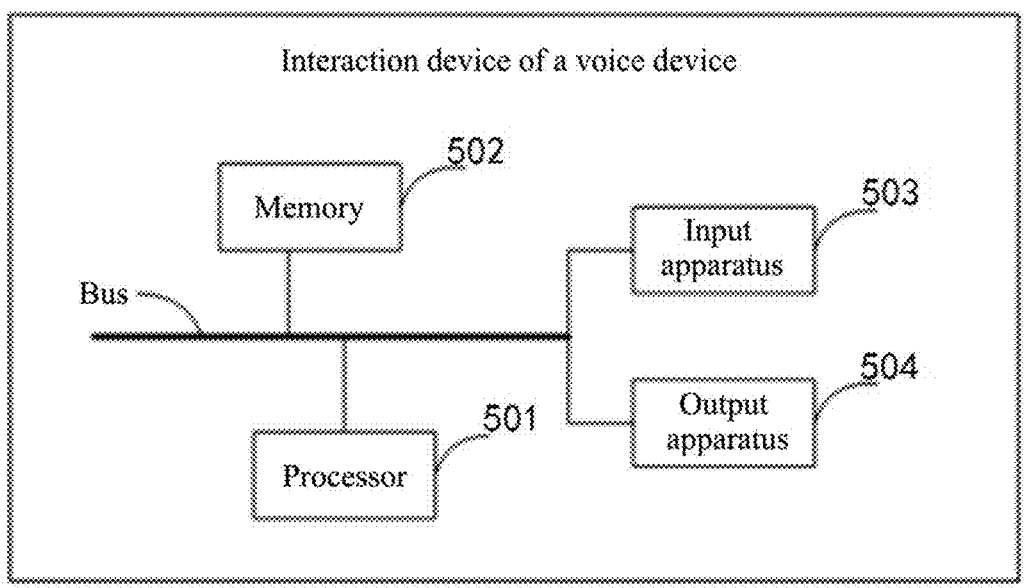
FIG. 5 is a schematic structural diagram of an interaction device of a voice device provided by an embodiment of the present application.

As shown in FIG. 5, there is a block diagram of an electronic device for an interaction method of a voice device according to an embodiment of the present application. The electronic device aims to represent various forms of digital computers, such as laptop computers, desktop computers, workstations, personal digital assistants, servers, blade servers, mainframe computers, and other suitable computers. The electronic device can also represent various forms of mobile apparatus, such as personal digital assistants, cellular phones, smartphones, wearable devices, and other similar computing devices. The components, their connections and relationships shown herein, and their functions are merely exemplary, and are not intended to limit implementations of the present application described and/or required herein.

As shown in FIG. 5, the electronic device includes: one or more processors 501, a memory 502, and interfaces for connecting various components, where the interfaces include high-speed interfaces and low-speed interfaces. The various components are connected with each other by using different buses, and can be installed on a public mainboard or in other ways as required. The processor can process instructions executed in the electronic device, the instructions include instructions stored in the memory or those in the memory for displaying graphical information of a GUI (Graphical User Interface) on external input/output device (e.g., a display device coupled to an interface). In other implementation manners, if desired, a plurality of processors and/or buses can be used with multiple memories together. Likewise, a plurality of electronic devices can be connected, and each device provides partial necessary operations (e.g., serving as an array of servers, a group of blade servers, or a multi-processor system). In FIG. 5, one processor 501 is taken as an example.

The memory 502 is a non-transitory computer readable storage medium provided by the present application, where the memory stores instructions executable by the at least one processor, so that the at least one processor performs the interaction method of the voice device provided by the present application. The non-transitory computer readable storage medium according to the present application stores computer instructions, where the computer instructions are used to cause the computer to perform the interaction method of the voice device provided by the present application.

The memory 502 which serves as a non-transitory computer readable storage medium can be used to store non-transitory software programs, non-transitory computer executable programs and modules, for example, program instructions/modules (e.g., the first processing unit 1, the second processing unit 2 and the third processing unit 3 as shown in FIG. 3) corresponding to the interaction method of the voice device in the embodiments of the present application. The processor 501 executes various function applications and data processing of a server by running non-transitory software programs, instructions and modules stored in the memory 502, that is, to implement the interaction method of the voice device in the above embodiments.

The memory 502 can include a program memory area and a data memory area, where the program memory area can store an operating system and at least one application program required for functions; the data memory area can store data created based on the use of the electronic device for the interaction of the voice device, etc. Furthermore, the memory 502 can be a high-speed random access memory, or a permanent memory such as at least one magnetic disk memory, flash memory, or other permanent solid-state memories. In some embodiments, the memory 502 may include memories remotely set with respect to the processor 501, these remote memories can be connected to the electronic device for the interaction of the voice device through a network. Examples of the above network include, but are not limited to Internet, Intranet, a local area network, a mobile communication network, and combinations thereof.

The electronic device for the interaction method of the voice device can further include input apparatus 503 and output apparatus 504. The processor 501, the memory 502, the input apparatus 503 and the output apparatus 504 can be connected through a bus or in other ways, a bus is taken as an example for connection as shown in FIG. 5.

The input apparatus 503 can receive input digital or character information, and generate key signal input related to user settings and function control of the electronic device for the interaction of the voice device; for example, the input device can be a touch screen, a keypad, a mouse, a trackpad, a touchpad, an instructing rod, one or more mouse buttons, a trackball, a joystick, etc. The output apparatus 504 can be a display device, a supplementary lighting device (e.g., LED), a tactile feedback device (e.g., vibration motor), etc. The display device includes, but is not limited to a liquid crystal display (LCD), a light emitting diode (LED) display and a plasma display. In some embodiments, the display device can be a touch screen.

Various embodiments of the systems and techniques described herein can be implemented in digital electronic circuit systems, integrated circuit systems, ASICs (Application Specific Integrated Circuits), computer hardware, firmware, software, and/or combinations thereof. These various embodiments may include: implementation in one or more computer programs, where the one or more computer programs can be executed and/or interpreted in a programmable system including at least one programmable processor, the programmable processor may be a dedicated or general programmable processor, which can receive data and instructions from a storage system, at least one input apparatus and at least one output apparatus, and transmit data and instructions to the storage system, the at least one input apparatus and the at least one output apparatus.

These calculation programs (also known as programs, software, software applications, or codes) include machine instructions for a programmable processor, and these calculation programs can be implemented by using advanced procedures and/or object oriented programming languages, and/or assembly/machine languages. As used herein, the terms "machine readable medium" and "computer readable medium" refer to any computer program product, equipment, and/or apparatus (e.g., magnetic disk, optical disk, memory, programmable logic device (PLD)) for providing the programmable processor with machine instructions and/or data, including the machine readable medium which receives machine instructions as machine readable signals. The term "machine readable signal" refers to any signal for providing the programmable processor with machine instructions and/or data.

In order to provide interaction with a user, the systems and techniques described herein can be implemented in a computer, the computer includes: display apparatus (e.g., a CRT (cathode ray tube) or LCD (liquid crystal display) monitor) for displaying information to users, and a keyboard and a guiding device (e.g., a mouse or a trackball), a user can provide the computer with input through the keyboard and the guiding apparatus. Other types of apparatus can also be used to provide interaction with a user; for example, feedback provided to the user can be any form of sensory feedback (e.g., visual feedback, auditory feedback, and tactile feedback); and input from the user can be received in any forms (including sound input, voice input, and tactile input).

The systems and techniques described herein can be implemented in a computing system (e.g., as a data server) including back-end components, or a computing system (e.g., an application server) including middleware components, or a computing system (e.g., a user's personal computer with a GUI or a web browser, the user can interact with the embodiments of the systems and techniques described herein through the GUI or the web browser) including front-end components, or a computing system including any combination of such back-end components, middleware components, and front-end components. The components of the systems can be connected with each other through digital data communication (e.g., communication networks) in any form or medium. Examples of the communication networks include Local Area Network (LAN), Wide Area Network (WAN) and Internet.

The computer system may include a client and a server. The client and the server are generally remote from each other and typically interact through a communication network. The relation of the client and the server arises by virtue of computer programs running on corresponding computers and having a client-server relation to each other.

In the embodiments of the present application, the above embodiments can refer to each other for reference, and the same or similar steps and nouns will not be repeated one by one.

It should be appreciated that various forms of processes shown above can be used to reorder, add, or delete steps. For example, the steps recorded in the present application can be performed in parallel or sequentially or in different orders, as long as the desired results of the technical solutions disclosed in the present application can be achieved, no limitation is made herein.

The above specific embodiments do not limit the protection scope of the present application. Those skilled in the art should understand that various modifications, combinations, sub-combinations and substitutions can be made based on the design requirements and other factors. Any modification, equivalent alternative, or improvement within the spirit and principle of the present application shall be regarded as within the protection scope of the present application.

What is claimed is:

1. An interaction method of a voice device, wherein the interaction method is applied to the voice device, the voice device is in communicational connection with a control device, and the interaction method comprises:
    in response to a received wake-up message, starting a first target application indicated by the wake-up message;
    in response to received operation data of a user sent by the control device, generating a first control instruction according to the operation data of the user; and
    controlling, according to the first control instruction, the first target application to perform an operation indicated by the first control instruction.

2. The interaction method according to claim 1, wherein the in response to a received wake-up message comprises: in response to a received wake-up message of the control device, wherein the wake-up message of the control device is generated when the user starts a second target application in the control device;

the second target application is an application software or an application plugin which is installed in the control device and corresponds to the first target application, and the second target application is capable of transmitting data to the voice device.

3. The interaction method according to claim 1, wherein the in response to a received wake-up message comprises: in response to a received wake-up message of the user;

after starting the first target application indicated by the wake-up message of the user in response to the received wake-up message of the user, the interaction method further comprises:

sending a start instruction indicating an identity of the first target application to an application server, enabling the application server to send the start instruction to the control device, wherein the application server and the control device are in a long connection state;

after receiving the start instruction, starting, by the control device, the second target application corresponding to the start instruction.

4. The interaction method according to claim 1, wherein the voice device is provided with a communication controller, the in response to received operation data of a user sent by the control device comprises:

in response to the operation data of the user received by the communication controller and sent by the control device, wherein the operation data of the user is sent by the control device through a wireless network.

5. The interaction method according to claim 1, wherein the operation data of the user comprises any one or more of following categories:

voice input of the user in the control device;
touch input of the user in an analog interface of the control device;
input of the user captured by a camera of the control device; and
input of the user collected by a sensor of the control device.

6. The interaction method according to claim 1, further comprising:

receiving a second control instruction sent by the control device, and controlling, according to the second control instruction, the first target application to perform an operation indicated by the second control instruction, wherein the second control instruction is generated by the control device according to the operation data of the user detected.

7. The interaction method according to claim 1, wherein the voice device comprises a voice device with a screen, and the control device comprises a mobile communication terminal.

8. An electronic device, comprising:
at least one processor; and
a memory in communicational connection with the at least one processor; wherein,
the electronic device is in communicational connection with a control device, and the memory stores instructions executable by the at least one processor, the instructions are executed by the at least one processor, enabling the at least one processor to perform steps of:
starting a first target application indicated by a wake-up message in response to the received wake-up message;
generating a first control instruction according to operation data of a user, in response to the received operation data of the user sent by the control device; and
controlling, according to the first control instruction, the first target application to perform an operation indicated by the first control instruction.

9. The electronic device according to claim 8, wherein the at least one processor is configured to:

start the first target application indicated by a wake-up message of the control device in response to the received wake-up message of the control device;
wherein the wake-up message of the control device is generated when the user starts a second target application in the control device, and
the second target application is an application software or an application plugin which is installed in the control device and corresponds to the first target application, and the second target application is capable of transmitting data to the electronic device.

10. The electronic device according to claim 8, wherein the at least one processor is configured to:

start the first target application indicated by a wake-up message of the user in response to the received wake-up message of the user; send a start instruction indicating an identity of the first target application to an application server and enable the application server to send the start instruction to the control device, so as to instruct the control device to start the second target application corresponding to the start instruction, wherein the application server and the control device are in a long connection state.

11. The electronic device according to claim 8, wherein the electronic device is provided with a communication controller, and the at least one processor is configured to:

in response to the operation data of the user received by the communication controller and sent by the control device, generate the first control instruction according to the operation data of the user received by the communication controller and sent by the control device, wherein the operation data of the user is sent by the control device through a wireless network.

12. The electronic device according to claim 8, wherein the operation data of the user comprises any one or more of following categories:

voice input of the user in the control device;
touch input of the user in an analog interface of the control device;
input of the user captured by a camera of the control device; and
input of the user collected by a sensor of the control device.

13. The electronic device according to claim 8, wherein the at least one processor is configured to:

receive a second control instruction sent by the control device, and control, according to the second control instruction, the first target application to perform an operation indicated by the second control instruction, wherein the second control instruction is generated by the control device according to the operation data of the user detected.

14. The electronic device according to claim 8, wherein the electronic device comprises an electronic device with a screen, and the control device comprises a mobile communication terminal.

15. A non-transitory computer readable storage medium storing computer instructions, wherein the computer instructions are configured to cause an electronic device to perform steps of:

starting a first target application indicated by a wake-up message in response to the received wake-up message;

generating a first control instruction according to operation data of a user, in response to the received operation data of the user sent by a control device, wherein the electronic device is in communicational connection with the control device; and controlling, according to the first control instruction, the first target application to perform an operation indicated by the first control instruction.

16. The non-transitory computer readable storage medium according to claim 15, wherein the computer instructions are configured to:

start the first target application indicated by a wake-up message of the control device in response to the received wake-up message of the control device;

wherein the wake-up message of the control device is generated when the user starts a second target application in the control device; and the second target application is an application software or an application plugin which is installed in the control device and corresponds to the first target application, and the second target application is capable of transmitting data to the electronic device.

17. The non-transitory computer readable storage medium according to claim 15, wherein the computer instructions are configured to:

start the first target application indicated by a wake-up message of the user in response to the received wake-up message of the user;

send a start instruction indicating an identity of the first target application to an application server and enable the application server to send the start instruction to the control device, so as to instruct the control device to start the second target application corresponding to the start instruction, wherein the application server and the control device are in a long connection state.

18. The non-transitory computer readable storage medium according to claim 15, wherein the computer instructions are configured to:

in response to the operation data of the user received by the electronic device and sent by the control device, generate the first control instruction according to the operation data of the user received by the electronic device and sent by the control device, wherein the operation data of the user is sent by the control device through a wireless network.

19. The non-transitory computer readable storage medium according to claim 15, wherein the operation data of the user comprises any one or more of following categories:

voice input of the user in the control device;

touch input of the user in an analog interface of the control device;

input of the user captured by a camera of the control device; and input of the user collected by a sensor of the control device.

20. The non-transitory computer readable storage medium according to claim 15, wherein the computer instructions are configured to:

receive a second control instruction sent by the control device, and control, according to the second control instruction, the first target application to perform an operation indicated by the second control instruction, wherein the second control instruction is generated by the control device according to the operation data of the user detected.

\* \* \* \* \*